United States Patent
Xu et al.

(10) Patent No.: US 10,334,480 B2
(45) Date of Patent: Jun. 25, 2019

(54) METHOD, SYSTEM, DEVICE FOR CONTROLLING CONGESTION OR OVERLOAD AND EVOLVED NODE B (ENB)

(71) Applicant: ZTE Corporation, Shenzhen (CN)

(72) Inventors: Hui Xu, Shenzhen (CN); Yong Lv, Shenzhen (CN); Hongjun Liu, Shenzhen (CN); Zijiang Ma, Shenzhen (CN); Chen Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 126 days.

(21) Appl. No.: 15/514,135

(22) PCT Filed: Mar. 20, 2015

(86) PCT No.: PCT/CN2015/074799
§ 371 (c)(1),
(2) Date: Mar. 24, 2017

(87) PCT Pub. No.: WO2015/184901
PCT Pub. Date: Dec. 10, 2015

(65) Prior Publication Data
US 2017/0295519 A1    Oct. 12, 2017

(30) Foreign Application Priority Data

Sep. 24, 2014  (CN) .......................... 2014 1 0493801

(51) Int. Cl.
*H04W 28/12* (2009.01)
*H04L 12/801* (2013.01)
(Continued)

(52) U.S. Cl.
CPC ............. *H04W 28/12* (2013.01); *H04L 47/12* (2013.01); *H04W 4/06* (2013.01);
(Continued)

(58) Field of Classification Search
CPC ... H04W 72/005; H04W 28/08; H04W 72/12; H04W 4/06; H04W 88/08; H04W 28/02;
(Continued)

(56) References Cited

U.S. PATENT DOCUMENTS

2013/0281090 A1* 10/2013 Maeda .................. H04W 48/02
                                                                455/434
2014/0036676 A1*  2/2014 Purnadi ............. H04W 36/0055
                                                                370/235
(Continued)

FOREIGN PATENT DOCUMENTS

CN         1499760 A      5/2004
CN         1518243 A      8/2004
(Continued)

OTHER PUBLICATIONS

International Search Report for corresponding application No. PCT/CN2015/074799 filed Mar. 20, 2015; dated Jul. 22, 2015.
(Continued)

*Primary Examiner* — Jung Liu
(74) *Attorney, Agent, or Firm* — Cantor Colburn LLP

(57) ABSTRACT

Provided are a method, system, device for controlling congestion or overload and an eNB. The method includes: one or more eNBs configured to detect congestion or overload of user plane data are selected, and the one or more eNBs selected are notified; the one or more eNBs selected detect a congestion or overload event of the user plane data; when a triggering condition is met, the one or more eNBs selected send congestion or overload indication information to a GCS AS; and the GCS AS determines a start or end of congestion or overload which occurs in an MBMS area according to the congestion or overload indication information, and correspondingly selects a manner in which trunking service data are sent. By the technical solutions of the disclosure, the (Continued)

problem of influence for a trunking service when congestion or overload occurs in a network may be solved.

16 Claims, 5 Drawing Sheets

(51) Int. Cl.
*H04W 4/06* (2009.01)
*H04W 28/02* (2009.01)
*H04W 76/40* (2018.01)

(52) U.S. Cl.
CPC ... *H04W 28/0284* (2013.01); *H04W 28/0289* (2013.01); *H04L 47/14* (2013.01); *H04W 76/40* (2018.02)

(58) Field of Classification Search
CPC ..... H04W 48/16; H04W 48/02; H04W 48/08; H04W 84/045; H04W 36/0083; H04L 47/125; H04L 12/189
See application file for complete search history.

(56) References Cited

U.S. PATENT DOCUMENTS

| | | | | |
|---|---|---|---|---|
| 2014/0233452 A1* | 8/2014 | Kim | ................... | H04L 12/1881 370/312 |
| 2015/0023243 A1* | 1/2015 | Liu | ...................... | H04L 12/189 370/312 |
| 2015/0373506 A1* | 12/2015 | Jung | ..................... | H04L 12/189 370/312 |
| 2016/0007320 A1* | 1/2016 | Wang | ................... | H04W 28/02 370/235 |
| 2016/0249183 A1* | 8/2016 | Kim | ........................ | H04W 4/06 |
| 2016/0249266 A1* | 8/2016 | Kim | ........................ | H04W 4/06 |
| 2016/0374050 A1* | 12/2016 | Prasad | .................... | H04W 4/06 |
| 2017/0111934 A1* | 4/2017 | Wang | .................... | H04W 76/10 |
| 2018/0206137 A1* | 7/2018 | Ryu | ........................ | H04W 4/06 |

FOREIGN PATENT DOCUMENTS

| | | |
|---|---|---|
| CN | 102905314 A | 1/2013 |
| CN | 104301931 A | 1/2015 |

OTHER PUBLICATIONS

European Search Report for corresponding application EP15803062; Report dated Sep. 8, 2017.

New Work Iten: Group Call eMBMS Congestion Management, 3GPP Draft; vol. TSG RAN, No. Sophia Antipolis France 20140610-20140613; Jul. 2, 2014, XP050836777; URL: Http://www.3gpp.org/ftp/tsg_sa/WG2_Arch/TSGS2_104_Dublin/Docs/.

* cited by examiner

METHOD, SYSTEM, DEVICE FOR CONTROLLING CONGESTION OR OVERLOAD AND EVOLVED NODE B (ENB)

TECHNICAL FIELD

The disclosure relates to a technology for controlling congestion or overload, and more particularly to a method, system, device for controlling congestion or overload and an eNB.

BACKGROUND

A trunking communication system is a dedicated wireless communication system, which is developed for meeting a commanding and scheduling requirement of a user in the industry and oriented to a specific industrial application. A large number of wireless users share a small number of wireless channels in the system; the system is mainly applied for commanding and scheduling, and is a multipurpose and high-performance wireless communication system. The trunking communication system has a broad application market in the fields of government departments, public security, emergency communication, power, civil aviation, petrochemical industry, military and the like.

A trunking communication system experiences a development history similar to a cellular mobile communication system. A first-generation trunking system is an analogue trunking communication system, which mainly supports voice communication. The analogue trunking communication system earliest introduced into China is an Actionet system of the Nokia corporation, and the system adopts MPT-1327 signalling applied to a 450 MHz frequency band. Then, F.A.S.T of Japan and Smartnet of Motorola corporation of the United States are introduced into China, and the market share occupied by them in the trunking market in China is more than 80 percent for a long term.

A second-generation trunking system is a narrowband digital trunking communication system, rising in the 1990s, and is started to be deployed in China in about 2004, which is a trunking communication system most widely applied in China at present. The digital trunking communication system supports voice and low-speed data (at most 28.8 kbps) communication, and representative systems include a Terrestrial Trunked Radio (TETRA) system defined by the European Telecommunications Standards Institute (ETSI), an Integrated Digital Enhanced Networks (iDEN) system of the Motorola corporation of the United States, a Global Open Trunking Architecture (GoTa) system developed by the ZTE Corporation on the basis of Code Division Multiple Access 1X (CDMA1X), and a GT800 system developed by the Huawei Technologies Co., Ltd. on the basis of Global System for Mobile Communications (GSM). In recent two to three years in China, Terrestrial Trunked Radio (TETRA) networks grow fastest, and the number of the TETRA networks is about 2/3 of digital trunking communication networks constructed in the whole country.

A characteristic differentiating a trunking system from a public system is that the trunking system is required to have an efficient commanding and scheduling characteristic and a network is required to have high reliability and security.

Call control: a service bearer is established, maintained and released between a calling user and a called user according to a service request of a user.

Authentication and certification: authentication and certification functions are supported, and the authentication function includes authentication performed by a network side for a terminal and two-way authentication performed by the network side for the terminal and performed by the terminal for the network side.

Fail soft: when a link between a network side and an eNB or between network elements inside the network side fails, the eNB may provide limited trunking service for user terminals within its coverage.

Network interconnection and intercommunication function: intercommunication with a Public Switched Telephone Network (PSTN), a public mobile communication system (a GSM or CDMA, Time Division-Long Term Evolution (TD-LTE) and the like), an Internet Protocol (IP) telephone, a trunking communication system of another model and the like may be implemented. In 3rd Generation Partnership Project (3 GPP) LTE, trunking communication is called as a Group Communication Service Enabler (GCSE). FIG. 1 is a system structure of an LTE GCSE.

For effectively utilizing a mobile network resource, the 3GPP proposes a Multimedia Broadcast Multicast Service (MBMS), which is a technology for transmitting data from a data source to multiple target mobile terminals, and the MBMS implements sharing of a network (including a core network and an access network) resource and increases a utilization rate of the network resource (particularly an air interface resource). The MBMS defined by the 3GPP may not only implement to multicast and broadcast pure-text low-rate message but also implement to broadcast and multicast high-speed multimedia service and the MBMS provides various video, audio and multimedia services, which undoubtedly follows a development trend of mobile data in the future and provides broader service prospect for development of 3rd or 4th-Generation (3 or 4G).

Characteristics of the MBMS are large service data volume, long receiving duration of a mobile terminal and constant average data rate. The aforementioned characteristics determine that both scheduling and control signalling configuration of the MBMS are semi-static, that is, scheduling information and control signalling information of the MBMS are kept unchanged "for a long time", and the information is periodically sent through an MBMS Control Channel (MCCH), and is collectively referred to as MCCH information. Multiple MCCHs may exist in an Evolved MBMS (eMBMS) system, each MCCH corresponds to a different Signal Frequency Network (MBSFN) area, and only control information of an MBMS sent by a corresponding MBSFN area is borne on the MCCH. FIG. 2 is a structure diagram of an MBMS in LTE.

At present, the industry is discussing the probability to realize trunking communication by adopting an MBMS technology. For specific trunking User Equipment (UE), a required trunking service may be received in any one of the following two manners: multicast and unicast, wherein the multicast manner is that the trunking service is borne and received through the MBMS, and at this moment, the UE is required to have an MBMS receiving capability.

In a researching and practicing process in the related technology, it is found that the related technology has the following problems: a Group Communication Service (GCS) Application Server (AS) sends a congestion or overload detection request to a Multicell/Multicast Coordination Entity (MCE); the MCE which receives the request sends a request to all eNBs in an MBSFN area; and the eNB which detects congestion or overload reports information to the GCS AS through the MCE. Since congestion or overload occurs in all the eNBs in the MBSFN area, all the eNBs in the MBSFN area report the same information to the MCE, which obviously wastes an M2 interface resource and reduces work efficiency.

SUMMARY

The technical problem to be solved by the disclosure is to provide a method and system for controlling congestion or overload, which are configured to solve the problem of influence for a trunking service when congestion or overload occurs in a network.

To solve the problem, the technical solutions are implemented as follows.

A method for controlling congestion or overload includes:

selecting one or more eNBs configured to detect congestion or overload of user plane data, and notifying the one or more eNBs selected;

detecting, by the one or more eNBs selected, a congestion or overload event of the user plane data;

sending, by the one or more eNBs selected, congestion or overload indication information to a GCS AS when a triggering condition is met; and determining, by the GCS AS, a start or end of congestion or overload which occurs in an MBMS area according to the congestion or overload indication information reported by the one or more eNBs selected, and selecting, by the GCS AS, a manner in which trunking service data are sent.

In an example embodiment, selecting the one or more eNBs configured to detect the congestion or overload of the user plane data includes:

mapping, by an MCE, a Service Area Identifier (SAI) required onto be detected to multiple cells, selecting, by the MCE, one or more cells from the multiple cells as one or more monitoring cells, and determining, by the MCE, one or more eNBs to which the one or more monitoring cells belong as the one or more eNBs configured to detect the congestion or overload of the user plane data; or, selecting, by Operation and Maintenance (O&M), one or more eNBs in an MBMS over an MBSFN area required to be detected as the one or more eNBs configured to detect the congestion or overload of the user plane data; or, selecting, by the GCS AS, one or more eNBs as the one or more eNBs configured to detect the congestion or overload of the user plane data.

In an example embodiment, the congestion or overload indication information includes at least one of the following information: a congestion or overload Identity (ID), a cell ID and/or an SAI, a Temporary Mobile Group Identity (TMGI) and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by congestion or overload; and the congestion or overload starting ID is configured to indicate whether congestion or overload starts or ends.

In an example embodiment, sending, by the one or more eNBs selected, the congestion or overload indication information to the GCS AS includes:

reporting, by the one or more eNBs selected, all TMGIs, which represent a trunking service influenced by congestion or overload, to an MCE, and reporting, by the MCE, a TMGI of a specific congested or overloaded service to the GCS AS, wherein the TMGI of the specific congested or overloaded service is selected by the MCE according to a corresponding relationship between a Quality of Service Class Identifier (QCI) or Allocation and Retention Priority (ARP) and a TMGI; or, requesting, by the GCS AS, an SAI and TMGI with status reporting requirements, sending, by the GCS AS, a request message, through an MCE, to the one or more eNBs selected, and reporting, by the one or more eNBs selected which receive the request message, a state of the TMGI in the SAI to the GCS AS through the MCE.

In an example embodiment, the congestion or overload event of the user plane data includes:

an event in which the congestion or overload of the user plane data is switched from a starting state to an ending state, or an event in which the congestion or overload of the user plane data is switched from the ending state to the starting state.

In an example embodiment, the triggering condition includes any one of the following conditions:

a condition in which the congestion or overload event of the user plane data is detected, a condition in which the GCS AS requests to send information, a condition in which the GCS AS requests to send information and the congestion or overload event of the user plane data is detected, and a condition of reporting periodically.

A method for controlling congestion or overload, including:

detecting, by one or more eNBs selected to detect congestion or overload, a congestion or overload event of user plane data; and sending, by the one or more eNBs selected, congestion or overload indication information to a GCS AS when a triggering condition is met.

In an example embodiment, the congestion or overload indication information includes at least one of the following information:

a congestion or overload ID, a cell ID and/or an SAI, a TMGI and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by congestion or overload; and the congestion or overload starting ID is configured to indicate whether congestion or overload starts or ends.

In an example embodiment, sending, by the one or more eNBs selected, the congestion or overload indication information to the GCS AS includes:

reporting, by the one or more eNBs selected, all TMGIs, which represent a trunking service influenced by congestion or overload, to an MCE; or, reporting, by the one or more eNBs selected, a state of a TMGI in an SAI to the GCS AS through an MCE according to the SAI and TMGI with status reporting requirements in a request message sent by the GCS AS.

In an example embodiment, the congestion or overload event of the user plane data includes:

an event in which the congestion or overload of the user plane data is switched from a starting state to an ending state, or an event in which the congestion or overload of the user plane data is switched from the ending state to the starting state.

In an example embodiment, the triggering condition includes any one of the following conditions:

a condition in which the congestion or overload event of the user plane data is detected, a condition in which the GCS AS requests to send information, a condition which the GCS AS requests to send information and the congestion or overload event of the user plane data is detected, and a condition of reporting periodically.

A system for controlling congestion or overload, including a selection component, a detection component, a sending component and a processing component, wherein the selection component, which is configured in network equipment, configured to select one or more eNBs configured to detect congestion or overload of user plane data, and notify the one or more eNBs selected;

the detection component, which is configured in an eNB, configured to detect a congestion or overload event of the user plane data when the eNB is selected;

the sending component, which is configured in the eNB, configured to send congestion or overload indication information to a GCS AS when a triggering condition is met; and the processing component, which is configured in the GCS AS, configured to determine a start or end of congestion or overload which occurs in an MBMS area according to the congestion or overload indication information reported by the one or more eNBs selected, and select a manner in which trunking service data are sent.

In an example embodiment, the network equipment includes any one of the following equipment:

an MCE, O&M and a GCS AS;

wherein the selection component is configured to select the one or more eNBs configured to detect the congestion or overload according any one of the following manners:

when the selection component is configured in the MCE, mapping, by the selection component, an SAI required to be detected onto multiple cells, selecting, by the selection component, one or more cells from the multiple cells as one or more monitoring cells, and determining, by the selection component, one or more eNBs to which the one or more monitoring cells belong as the one or more eNBs configured to detect the congestion or overload of the user plane data;

when the selection component is configured in the O&M, selecting, by the selection component, one or more eNBs in an MBMS over an MBSFN area required to be detected as the one or more eNBs configured to detect the congestion or overload of the user plane data; and when the selection component is configured in the GCS AS, selecting, by the selection component, one or more eNBs as the one or more eNBs configured to detect the congestion or overload of the user plane data.

In an example embodiment, the congestion or overload indication information includes at least one of the following information:

a congestion or overload ID, a cell ID and/or an SAT, a TMGI and a congestion or overload starting ID, wherein the congestion or overload ID is configured to indicate congestion or overload in a network; the cell ID is configured to indicate a cell influenced by congestion or overload; the SAT is configured to indicate an MBMS area influenced by congestion or overload; the TMGI is configured to indicate a trunking service influenced by congestion or overload; and the congestion or overload starting ID is configured to indicate whether congestion or overload starts or ends.

In an example embodiment, the sending component is configured to send the congestion or overload indication information to the GCS AS according to the following manner:

reporting, the sending component, all TMGIs, which represent a trunking service influenced by congestion or overload, to an MCE, and reporting, by the MCE, a TMGI of a specific congested or overloaded service to the GCS AS, wherein the TMGI of the specific congested or overloaded service is selected by the MCE according to a corresponding relationship between a QCI or ARP and a TMGI; or, requesting, by the GCS AS, an SAT and TMGI with status reporting requirements, sending, by the GCS AS, a request message, through an MCE, to the one or more eNBs selected, and reporting, by the sending component, a state of the TMGI in the SAT to the GCS AS through the MCE.

In an example embodiment, the congestion or overload event of the user plane data includes:

an event in which the congestion or overload of the user plane data is switched from a starting state to an ending state, or an event in which the congestion or overload of the user plane data is switched from the ending state to the starting state.

In an example embodiment, the triggering condition includes any one of the following conditions:

a condition in which the congestion or overload event of the user plane data is detected, a condition in which the GCS AS requests to send information, a condition in which the GCS AS requests to send information and the congestion or overload event of the user plane data is detected, and a condition of reporting periodically.

A device for controlling congestion or overload, configured in an eNB including a detection component and a sending component, wherein the detection component is configured to, when the eNB is selected to detect congestion or overload, detect a congestion or overload event of user plane data; and the sending component is configured to, when a triggering condition is met, send congestion or overload indication information to a GCS AS.

In an example embodiment, the congestion or overload indication information includes at least one of the following information:

a congestion or overload ID, a cell ID and/or an SAI, a TMGI and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by congestion or overload; and the congestion or overload starting ID is configured to indicate whether congestion or overload starts or ends.

In an example embodiment, the sending component is configured to send the congestion or overload indication information to the GCS AS according to the following manner:

reporting, by the sending component, all TMGIs, which represent a trunking service influenced by congestion or overload, to an MCE; or, reporting, the sending component, a state of a TMGI in an SAI to the GCS AS through an MCE according to the SAI and TMGI with status reporting requirements in a request message sent by the GCS AS.

In an example embodiment, the congestion or overload event of the user plane data includes:

an event in which the congestion or overload of the user plane data is switched from a starting state to an ending state, or an event in which the congestion or overload of the user plane data is switched from the ending state to the starting state.

In an example embodiment, the triggering condition includes any one of the following conditions:

a condition in which the congestion or overload event of the user plane data is detected, a condition in which the GCS AS requests to send information, a condition which the GCS AS requests to send information and the congestion or overload event of the user plane data is detected, and a condition of reporting periodically.

The disclosure further provides an eNB, which may include the abovementioned control device.

According to the technical solutions of the disclosure, it is realized that when congestion or overload of MBMS user plane data occurs, congestion or overload of an MBMS area may be determined according to indication information of a part of eNBs, so that efficiency is improved, an influence of network congestion or overload on a trunking service is reduced, and service experiences of a user are improved.

DETAILED DESCRIPTION OF THE EMBODIMENTS

The technical solutions of the disclosure will be described below with reference to the drawings and embodiments in details.

It is important to note that the embodiments of the disclosure and characteristics in the embodiments may be combined without conflicts and all combinations fall within the scope of protection of the disclosure. In addition, although logical sequences are shown in the flowcharts, the shown or described steps may be executed in sequences different from the sequences shown here under some conditions.

If there are no specific descriptions, an MBMS of the embodiments of the disclosure refers to an evolved MBMS, i.e. eMBMS, and an AS refers to a GCS AS.

A method for controlling trunking communication congestion or overload in embodiments of the disclosure includes:

one or more eNBs configured to detect congestion or overload of user plane data are selected, and the one or more eNBs selected are notified;

the one or more eNBs selected detect a congestion or overload event of the user plane data;

the one or more eNBs selected send congestion or overload indication information to a GCS AS when a triggering condition is met; and the GCS AS determines a start or end of congestion or overload which occurs in an MBMS area according to the congestion or overload indication information reported by the one or more eNBs selected, and selects a manner in which trunking service data are sent.

The triggering condition includes any one of the following:

a condition in which the congestion or overload event of the user plane data is detected, a condition in which the GCS AS requests to send information, a condition in which the GCS AS requests to send information and the congestion or overload event of the user plane data is detected, and a condition of reporting periodically (that is: reporting is triggered once at an interval of a time period).

Figure 1:
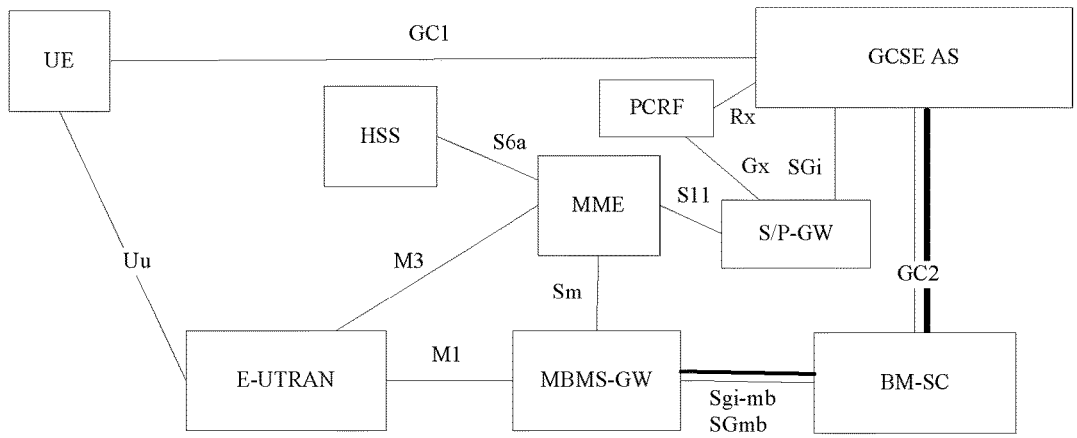
FIG. 1 is a structure diagram of a trunking communication system.
Figure 2:
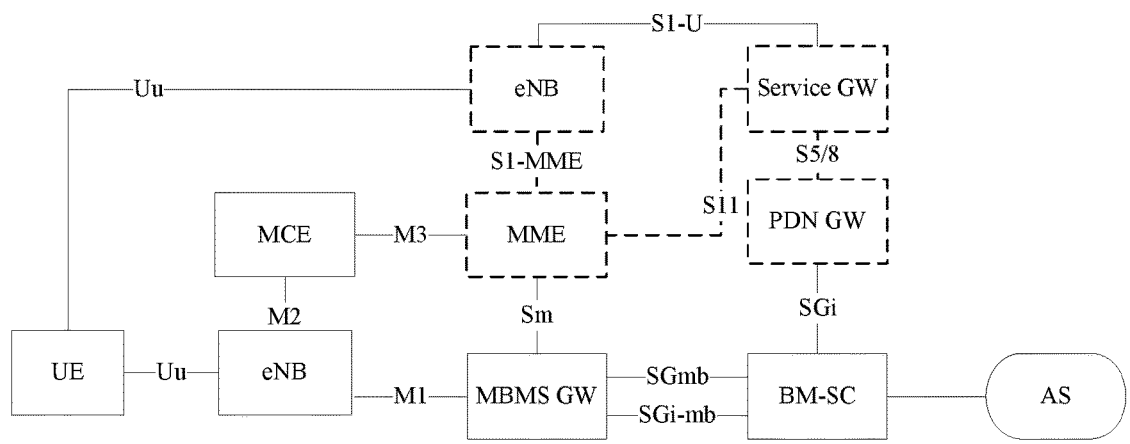
FIG. 2 is a structure diagram of MBMS communication.
Figure 3:
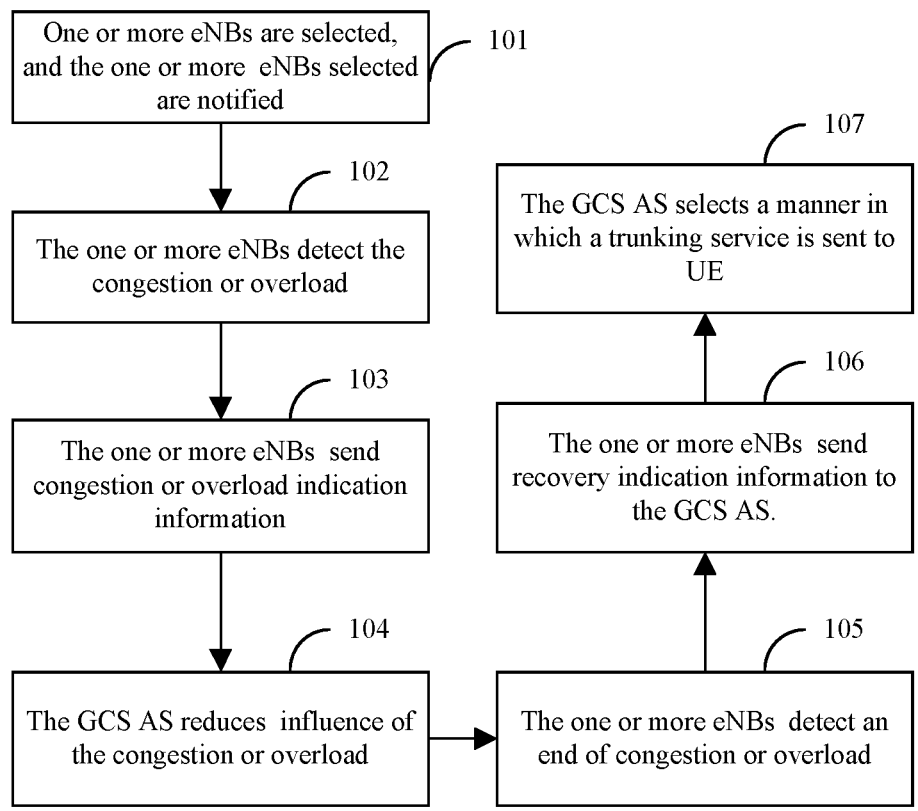
FIG. 3 is a flowchart of a method according to an embodiment of the disclosure.

A specific process, as shown in FIG. 3, includes the following steps.

At step 101, one or more eNBs configured to detect congestion or overload of user plane data are selected, and the one or more eNBs selected are notified.

The selection is any one of following: selection by an MCE, selection by a GCS AS and selection by O&M. The congestion or overload refers to congestion or overload of a user plane data service of an MBMS, and a judgment criterion of the congestion or overload is required to be formulated and notified to a target eNB in advance. Alternatively, the judgment criterion may be contained in an indication message.

Under a normal condition, when MBMS user plane data in an MBSFN area is congested or overloaded, because all eNBs participating in MBSFN transmission in the MBSFN area have the same resource configuration, so the congestion or overload occurs at all the eNBs. At this moment, if all the eNBs report congestion or overload indication information on M2 interfaces, reported contents are completely the same, so that it is unnecessary to report the congestion or overload indication information by all the eNBs, and it may be determined that congestion occurs in the MBSFN area or MBMS area via reporting congestion or overload by only one eNB in one MBSFN area. That is, all congestion or overload information may be presumed according to a part of congestion or overload information, so that not only is detection efficiency improved, but also a network signalling load is reduced.

One or more eNBs may be configured to detect the congestion or overload, and one eNB may usually be selected in one MBSFN area when the eNB configured to detect the congestion or overload is selected by the MCE or the O&M. Notification may be implemented through the O&M or a signalling manner.

When the eNB configured to detect the congestion or overload is selected by the GCS AS, it is considered that the congestion or overload does not occur at the selected eNB, but the congestion or overload may still occur in a target MBMS area. For example, there are multiple MBSFN areas in the target MBMS area, the congestion or overload does not occur in the MBSFN area where the eNB is located, the congestion or overload occurs in other MBSFN area, but the GCS AS does not know about a configuration of the MBSFN area. In order to avoid occurrence of the condition as much as possible, the GCS AS may select multiple eNBs configured to detect the congestion or overload. Of course, only one eNB may be selected to detect the congestion or overload.

The eNB configured to detect the congestion or overload is an eNB in a specific MBMS area. There are usually multiple eNBs in an MBMS area, and at this moment, any eNB may be selected to detect the congestion or overload.

It should be pointed out that the target MBMS area is usually also specified at the same time of selecting the eNB configured to detect the congestion or overload. The target MBMS area is an area which needs to be detected on congestion or overload. When the target MBMS area is specified, an SAI is adopted. If there is no MBMS area specified, because a single eNB may belong to multiple MBMS areas, the selected eNB detects congestion or overload states of all the MBMS areas to which the selected eNB belongs. The eNB configured to detect congestion or overload may also be selected by indication of a cell ID, that is, the eNB is determined through the cell ID.

In the embodiments of the disclosure, the following descriptions represent the same concept: an MBMS bearer, an MBSFN bearer, a multicast bearer and a Point To Multipoint (PTM) bearer.

The MBMS bearer includes a core network bearer (i.e. an Evolved Packet Core network (EPC) bearer) and an air interface bearer, and a Radio Access Network (RAN) (the eNB and/or the MCE) configures an MBMS air interface resource, and sends MBMS configuration information and trunking data at an air interface.

It should be pointed out that a user plane service where congestion or overload occurs may be an ordinary MBMS or a GCS, and the ordinary MBMS and the GCS may be differentiated through different QCI parameters. For the ordinary MBMS, no corresponding MBMS bearer is required to be established in advance.

At step 102, the one or more eNBs configured to detect the congestion or overload detect the congestion or overload (that is, the congestion or overload is in a starting state).

The congestion refers to that a user plane data load reaches a preset threshold, and the overload refers to that it is impossible for a network node to continue processing an additional user plane data load. The user plane data mentioned in the embodiments of the disclosure refer to MBMS data on a Physical Multicast Channel (PMCH).

The one or more eNBs configured to detect the congestion or overload may judge whether the MBMS user plane data is congested or overloaded according to a preset rule, that is, a congestion or overload judgment condition is predefined, and the one or more eNBs configured to detect the congestion or overload determine to detect the congestion or overload when judging that the judgment condition is met.

In an example embodiment, the congestion or overload judgment condition is the set judgment rule, which may be carried in an indication message sent to the eNB, besides being preset.

At step 103, the one or more eNBs configured to detect the congestion or overload send congestion or overload indication information to a GCS AS.

The one or more eNBs configured to detect the congestion or overload send the congestion or overload indication information to the GCS AS through eNB→MCE→Mobility Management Entity (MME)→MBMS GateWay (GW)→Broadcast Multicast-Service Centre (BM-SC)→GCS AS.

The one or more eNBs configured to detect the congestion or overload send the indication information to the MCE through an M2 interface at first, wherein the indication information transmission may be implemented by adopting related M2 interface signalling and adding a new indication field, or, directly by adopting new M2 interface signalling.

Similarly, when being sent on an M3 interface, an Sm interface, an SGmb interface and an MB2-c interface, the congestion or overload indication information may be implemented by adopting related interface signalling and adding a new indication field, or, directly adopting new dedicated interface signalling.

The congestion or overload indication information includes at least one of the following: a congestion or overload ID, a cell ID (Evolved Universal Terrestrial Radio Access Network (E-UTRAN) Cell Identifier (ECI) or E-UTRAN Cell Global Identifier (ECGI)) and/or SAI, an MBMS ID (TMGI) and a congestion or overload starting ID, wherein the congestion or overload ID is configured to indicate congestion or overload in a network, the cell ID is configured to indicate a cell influenced by congestion or overload, the SAI is configured to indicate an MBMS area influenced by congestion or overload, and the TMGI is configured to indicate a trunking service influenced by the congestion or overload.

The congestion or overload starting ID is configured to indicate whether the congestion or overload starts (namely exists) or ends. For example, the start is indicated by 1 or true, and the end is indicated by 0 or false.

The start or end of the congestion or overload is that: the start of the congestion or overload is equivalent to that the congestion or overload currently occurs, and the end of the congestion or overload is equivalent to that no congestion or overload currently occurs or the started congestion or overload has ended.

Node congestion refers to that a load of MBMS user plane data in a network reaches a preset threshold; and node overload refers to that the network node cannot continue processing an extra MBMS user plane data load.

The content of MBMS congestion or overload information reported is: if congestion is indicated by C and overload is indicated by O, for example:
{ECI1: TMGI1, TMGI2, TMGI3; C, true},
{ECI2: TMGI5, TMGI6; O, false} and
{ECI3: TMGI10; C, false}.

Notes: in the examples above, congestion occurs at TMGI1, TMGI2 and TMGI3 in ECI1; overload of TMGI5 and TMGI6 in ECI2 ends; and congestion of TMGI10 in ECI3 ends.

The congestion or overload indication information may be modified in a sending process, cell ID ECI is usually modified into an SAI in an MBMS area, and if the MCE modifies an ECI in the received indication information into an SAI, the GCS AS may determine the MBMS area in which congestion or overload occurs according to the received indication information.

Under the condition that the overload indication O is 1 (True), the congestion indication C may not be sent any more; or although the congestion indication C is sent, UE may ignore the indication.

Considering that congestion or overload may occur only in a specific trunking service (for example: Push To Talk (PTT)), it is determined that the service where the congestion or overload occurs is the specific trunking service according to QoS information of the service, for example, the QCI or the ARP. Since the eNB does not know about the QoS information of the service, there are two congestion or overload reporting methods for the eNB.

1) The one or more eNBs report all service IDs TMGIs, which represent a trunking service influenced by congestion or overload, to the MCE, and the MCE reports a TMGI of a specific congested or overloaded service to the GCS AS, wherein the TMGI of the specific congested or overloaded service is selected by the MCE according to the TMGI of the specific service (the MCE according to a corresponding relationship between a QCI or ARP and a TMGI).

2) The GCS AS requests an SAI and TMGI with status reporting requirements, and sends a request message to the eNB through a path GCS AS→BM-SC→MBMS GW→MME→MCE→eNB, and the eNB reports a state of the TMGI in the specific SAI to the AS through eNB→MCE→M-

ME→MBMS GW→BM-SC→GCS AS. Alternatively, if the request message of the GCS AS only includes SAI information, the eNB reports all TMGI states in the SAI.

A triggering manner for sending the congestion or overload indication information may be any one of the following: event triggering, AS request triggering, combination of the two, and reporting periodically, wherein event triggering reporting refers to that the eNB configured to detect the congestion or overload reports indication information to the GCS AS when a congestion or overload starting or ending event occurs at the network node; the AS request triggering refers to that the GCS AS sends the request message to the eNB configured to detect the congestion or overload and the eNB receiving the request reports state information of the node to the GCS AS; the combination of the two refers to that the GCS AS sends the request message to the eNB configured to detect the congestion or overload or the eNB configured to detect the congestion or overload reports indication information to the GCS AS when detecting a congestion or overload event; and reporting periodically refers to that a reporting period is configured and the eNB configured to detect the congestion or overload reports the state of the node to the GCS AS in each period, wherein the reporting period may be specified in advance or specified when the AS sends the request.

The congestion or overload starting or ending event of the user plane data includes: an event in which the congestion or overload of the user plane data is switched from a starting state to an ending state, or an event in which the congestion or overload of the user plane data is switched from the ending state to the starting state. That is: when the triggering condition is that the congestion or overload event of the user plane data is detected, in case that no congestion or overload (equivalent to the ending state) is switched to the starting state (equivalent to that congestion or overload is detected), the eNB configured to detect the congestion or overload is required to report the state; in case that existence of congestion or overload (equivalent to the starting state) is switched to no congestion or overload (equivalent to the ending state), the eNB configured to detect the congestion or overload is required to report the state; and moreover, this means that the eNB configured to detect the congestion or overload is also required to report the state when the eNB configured to detect the congestion or overload detects a switch between a congestion state and an overload state (the congestion is switched to the overload or the overload is switched to the congestion), that is because a switch from the congestion state to the overload state is equivalent to a switch of the congestion from the starting state to the ending state and a switch of the overload from the ending state to the starting state; and a switch from the overload to the congestion is equivalent to a switch of the overload from the starting state to the ending state and a switch of the congestion from the ending state to the starting state, which all belong to congestion or overload starting or ending events of the user plane data Briefly, C=congestion indication, and is identified by {0, 1}; and O=overload indication, and is identified by {0, 1}. Once IDs of C and/or O change, the eNB configured to detect the congestion or overload is required to report it.

In a word, when the triggering condition is that congestion or overload event of the user plane data is detected, if the congestion or overload starting or ending state does not change, the eNB configured to detect the congestion or overload is not required to report, and then the GCS AS may accurately master the congestion or overload state of the MBMS.

At step 104, the GCS AS adopts an action for reducing influence of the congestion or overload.

The GCS AS determines influenced target UE and/or trunking service TMGI according to the congestion or overload indication information, and then the GCS AS determines an action to be adopted according to the congestion or overload indication information and a local strategy. In case of congestion, the GCS AS establishes a unicast bearer for the target UE, and sends the trunking service through the unicast bearer; and in case of overload, the GCS AS puts the trunking service in a queue and sends it after the overload ends, or, the GCS AS seizes a resource of a related trunking service by virtue of a high-priority trunking service.

At step 105, the one or more eNBs configured to detect the congestion or overload detect an end of congestion or overload.

The end of the congestion or overload refers to recovery of the network, for example: the user plane data load does not meet the preset congestion or overload judgment condition.

At step 106, the one or more eNBs configured to detect the congestion or overload send recovery indication information to the GCS AS.

The one or more eNBs configured to detect the congestion or overload send congestion or overload indication information to the GCS AS through eNB→MCE→MME→MBMS GW→BM-SC→GCS AS.

The congestion or overload indication information includes at least one of the following: the congestion or overload ID, the cell ID (the ECI or the ECGI) and/or SAI, the MBMS ID (the IMGI) and a congestion or overload ending ID.

A sending triggering manner is any one of the following: event triggering, AS request triggering, combination of the two, and reporting periodically.

At step 107, the GCS AS selects a manner in which a trunking service is sent to UE.

The GCS AS determines the influenced target UE through the recovery indication information, and selects a proper manner to send the trunking service to the target UE. For example: the trunking service is continued to be sent through a recovered MBMS bearer.

The embodiments of the disclosure further disclose a computer program, which includes a program instruction, and a computer may execute any abovementioned control method by executing the program instruction.

The embodiments of the disclosure further disclose a carrier carrying the computer program.

The solutions of the disclosure will be described below through embodiments of specific trunking service flows.

Embodiment 1

Figure 4:
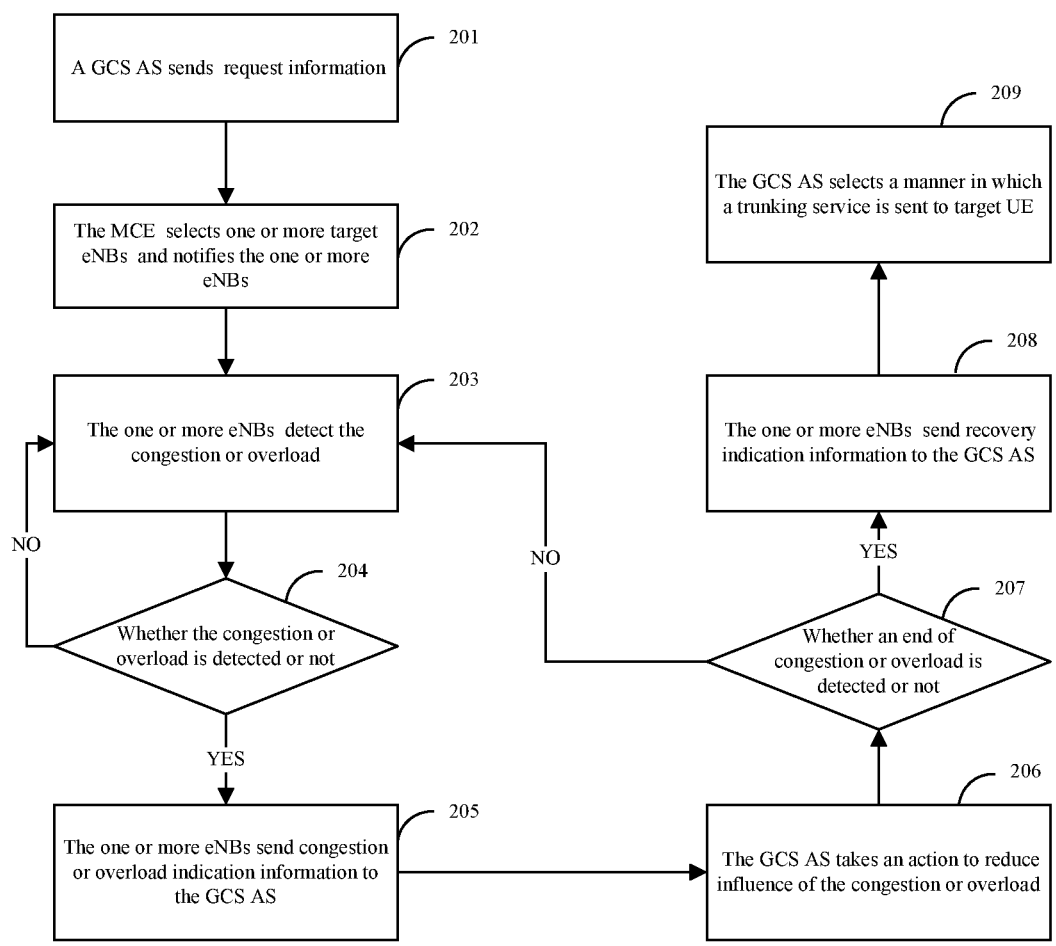
FIG. 4 is a flowchart of the embodiment 1 of the disclosure.

For a scenario where an MCE selects an eNB to detect congestion or overload, a method for implementing controlling trunking communication congestion, as shown in FIG. 4, includes the following steps.

At step 201, a GCS AS sends congestion or overload detection request information to an MCE.

The GCS AS sends the detection request information through GCS AS→BM-SC→MBMS GW→MME→MCE. The request information at least includes: an MBMS SAI.

At step 202, the MCE receiving the request information selects one or more target eNBs (i.e. one or more eNBs configured to detect congestion or overload) and notifies the one or more eNBs.

The MCE receives the request information, maps an SAI required to be detected in the request information onto multiple cells, selects one or more from the multiple cells as one or more monitoring cells, and determines one or more eNBs to which the one or more monitoring cells belong as the one or more eNBs configured to detect the congestion or overload of the user plane data. Notification may be implemented by notifying the one or more eNBs, which are selected, by adding a new request field into related M2 interface signaling such as an M2 session start request or M2 session update, or notifying the one or more eNBs, which are selected, by adopting new dedicated M2 interface signaling.

If multiple MCEs receive the request information, for example, the SAI specified by the GCS AS corresponds to multiple MCEs, each MCE selects a cell in the SAI, and notifies an eNB to which the selected cell belongs as the eNB configured to detect the congestion or overload.

At step 203, the one or more eNBs configured to detect the congestion or overload detect the congestion or overload.

The one or more eNBs configured to detect the congestion or overload detect congestion or overload of MBMS user plane data.

At step 204, the one or more eNBs configured to detect the congestion or overload judge whether the congestion or overload is detected or not, step 205 is executed if the congestion or overload is detected, otherwise step 203 is executed.

The one or more eNBs configured to detect the congestion or overload judge that the MBMS user plane data are congested or overloaded according to a preset rule, that is, a congestion or overload judgment condition is predefined, and the one or more eNBs configured to detect the congestion or overload determine the congestion or overload when judging that the judgment condition is met.

At step 205, the one or more eNBs configured to detect the congestion or overload send congestion or overload indication information to the GCS AS.

The one or more eNBs configured to detect the congestion or overload send the congestion or overload indication information through eNB→MCE→MME→BMBS GW→BM-SC→GCS AS.

The congestion or overload indication information includes at least one of the following: a congestion or overload ID, a cell ID (an ECI or an ECGI) and/or SAI, an MBMS ID (a TMGI) and a congestion or overload ending ID.

A sending triggering manner may be any one of the following: event triggering, AS request triggering, combination of the two, and reporting periodically.

At step 206, the GCS AS takes an action to reduce influence of the congestion or overload.

The GCS AS determines influenced target UE and trunking service at first, and takes different actions for congestion and overload information. For example, in case of congestion, the GCS AS sends a trunking service through a unicast bearer; and in case of overload, the GCS AS puts the trunking service in a queue and sends the trunking service after the overload ends, or, the GCS AS seizes a resource of a related trunking service by virtue of a high-priority trunking service.

At step 207, the one or more eNBs configured to detect the congestion or overload judge whether an end of congestion or overload is detected or not, step 208 is executed if the end of the congestion or overload is detected, otherwise step 203 is executed.

At step 208, the one or more eNBs configured to detect the congestion or overload send recovery indication information to the GCS AS.

A sending triggering manner may be any one of the following: event triggering, AS request triggering, combination of the two, and reporting periodically.

At step 209, the GCS AS selects a manner in which a trunking service is sent to target UE.

Embodiment 2

Figure 5:
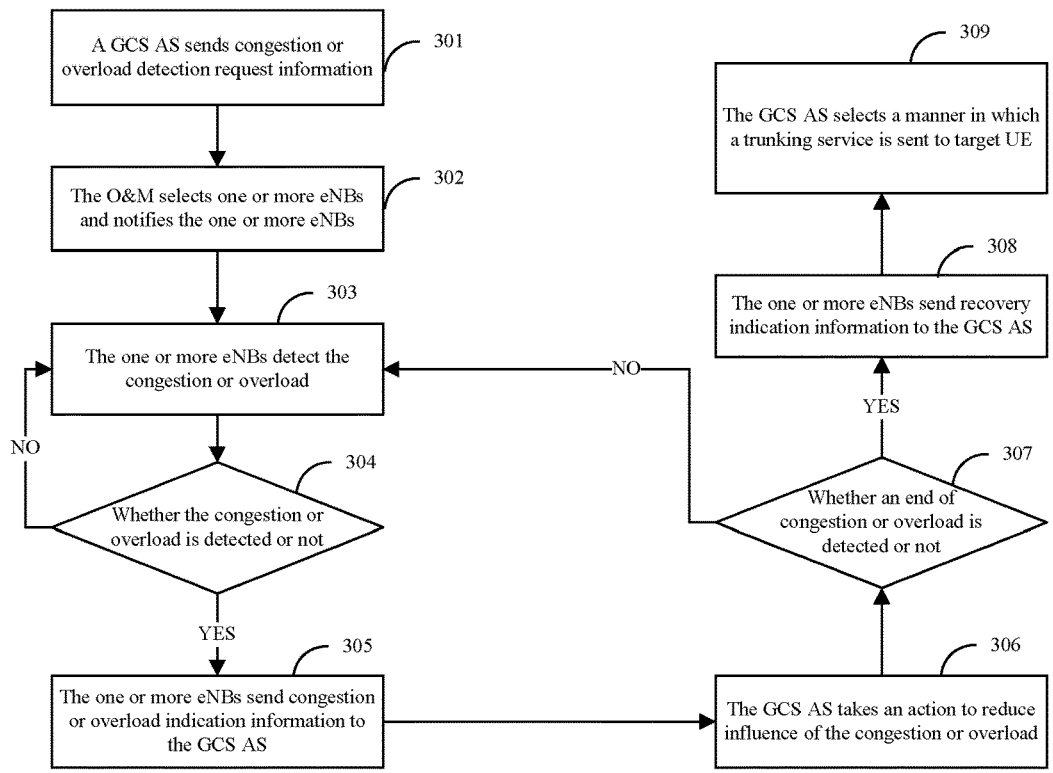
FIG. 5 is a flowchart of the embodiment 2 of the disclosure.

For a scenario where O&M selects an eNB to detect congestion or overload, a method for implementing controlling trunking communication congestion, as shown in FIG. 5, includes the following steps.

At step 301, a GCS AS sends congestion or overload detection request information.

The request information at least includes: an MBMS SAT. The request information may further include a congestion or overload judgment condition.

At step 302, the O&M selects one or more eNBs configured to detect congestion or overload and notifies the one or more eNBs.

The O&M usually refers to a network management system, and the O&M selects one or more eNBs from an MBSFN area required to be detected as the one or more eNBs configured to detect the congestion or overload of the user plane data, and notifies the one or more eNBs selected. Notification includes the congestion or overload detection request information and the MBMS SAT.

It should be pointed out that the one or more eNBs configured to detect the congestion or overload have stored the congestion or overload judgment condition and the O&M indicates the judgment condition to the one or more eNBs selected.

At step 303, the one or more eNBs configured to detect the congestion or overload detect the congestion or overload.

The congestion or overload refers to congestion or overload of MBMS user plane data, and specifically refers to congestion or overload on a PMCH.

At step 304, the one or more eNBs configured to detect the congestion or overload judge whether the congestion or overload is detected or not, step 305 is executed if the congestion or overload is detected, otherwise step 303 is executed.

The one or more eNBs configured to detect the congestion or overload determine whether congestion or overload occurs or not according to the stored congestion or overload judgment condition, notifies the GCS AS if the congestion or overload occurs, otherwise continues detection.

At step 305, the one or more eNBs configured to detect the congestion or overload send congestion or overload indication information to the GCS AS.

The one or more eNBs configured to detect the congestion or overload send the congestion or overload indication information to the GCS AS through eNB→MCE→MME→BMBS GW→BM-SC→GCS AS.

The congestion or overload indication information includes at least one of the following: a congestion or overload ID, a cell ID (an ECI or an ECGI) and/or SAI, an MBMS ID (a TMGI) and a congestion or overload ending ID.

A sending triggering manner may be any one of the following: event triggering, AS request triggering, combination of the two, and reporting periodically.

At step 306, the GCS AS takes an action to reduce influence of the congestion or overload.

The GCS AS determines influenced target UE and trunking service at first, and takes different actions for congestion and overload information. For example, in case of congestion, the GCS AS sends a trunking service through a unicast bearer; and in case of overload, the GCS AS puts the trunking service in a queue and sends the trunking service after the overload ends, or, the GCS AS seizes a resource of a related trunking service by virtue of a high-priority trunking service.

At step 307, the one or more eNBs configured to detect the congestion or overload judge whether an end of congestion or overload is detected or not, step 308 is executed if the end of the congestion or overload is detected, otherwise step 303 is executed.

At step 308, the one or more eNBs configured to detect the congestion or overload send recovery indication information to the GCS AS.

A sending triggering manner may be any one of the following: event triggering, AS request triggering, combination of the two, and reporting periodically.

At step 309, the GCS AS selects a manner in which a trunking service is sent to target UE.

Embodiment 3

Figure 6:
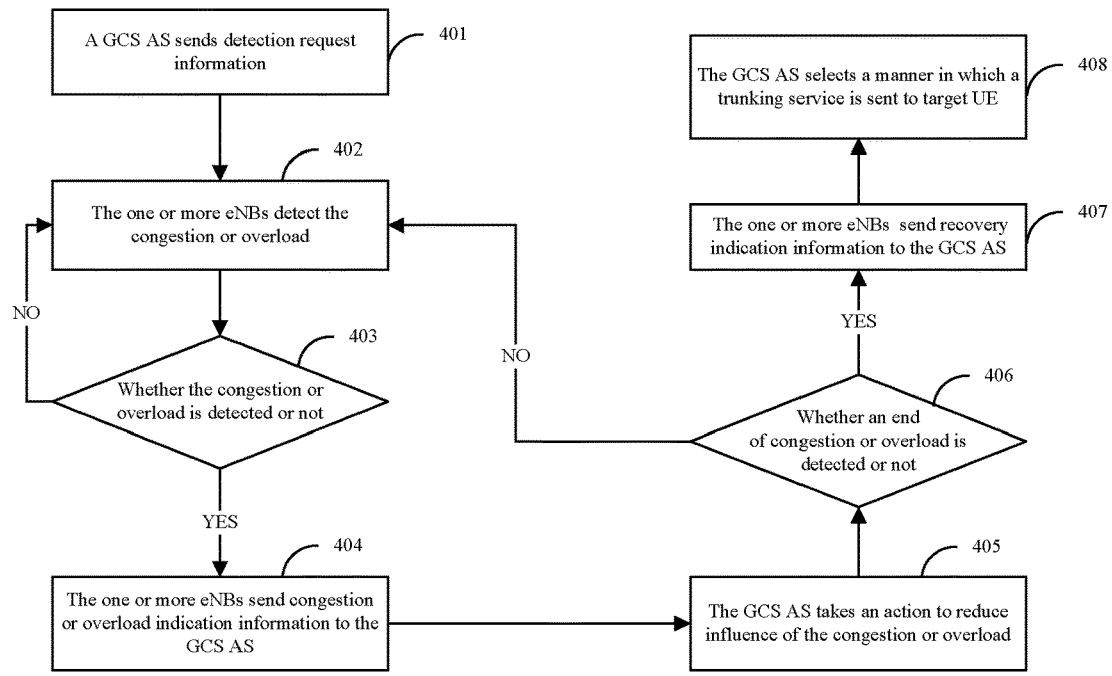
FIG. 6 is a flowchart of the embodiment 3 of the disclosure.

For a scenario where a GCS AS specifies one or more eNBs which detects congestion or overload, a method for implementing controlling trunking communication congestion, as shown in FIG. 6, includes the following steps.

At step 401, a GCS AS sends detection request information to one or more eNBs.

Before the one or more eNBs configured to detect the congestion or overload are selected, the GCS AS usually has known about cell information of an MBMS, that is, the GCS AS is required to send cell information of a GCS by adopting an MBMS bearer, and then the GCS AS selects a target cell, and may determine a required target eNB according to a selected cell ID.

The GCS AS only knows about MBMS area information, the GCS AS selects a certain eNB in an MBMS area to detect the congestion or overload, and if the eNB configured to detect the congestion or overload detects the congestion or overload, it is indicated that the congestion or overload occurs in the MBMS area. There is a possibility that the eNB selected by the GCS AS does not detect the congestion or overload but the congestion or overload occurs in the target MBMS area. In order to reduce the condition as much as possible, multiple eNBs may be selected from the target MBMS area to detect the congestion or overload.

The GCS AS sends the detection request information through GCS AS→BM-SC→MBMS GW→MME→MCE. The request information includes at least one of the following: an MBMS SAI and an ECI/ECGI/eNB ID.

At step 402, the one or more eNBs receiving the request information detect the congestion or overload.

The one or more eNBs receiving the request information detect congestion or overload of MBMS user plane data.

At step 403, the one or more eNBs configured to detect the congestion or overload judge whether the congestion or overload is detected or not, step 404 is executed if the congestion or overload is detected, otherwise step 402 is executed.

The one or more eNBs configured to detect the congestion or overload judge that the MBMS user plane data are congested or overloaded according to a preset rule, that is, a congestion or overload judgment condition is predefined, and the one or more eNBs configured to detect the congestion or overload determine the congestion or overload when judging that the judgment condition is met.

At step 404, the one or more eNBs configured to detect the congestion or overload send congestion or overload indication information to the GCS AS.

The one or more eNBs configured to detect the congestion or overload send the congestion or overload indication information to the GCS AS through eNB→MCE→MME→BMBS GW→BM-SC→GCS AS.

The congestion or overload indication information includes at least one of the following: a congestion or overload ID, a cell ID (an ECI or an ECGI) and/or SAI, an MBMS ID (a TMGI) and a congestion or overload ending ID.

A sending triggering manner may be any one of the following: event triggering, AS request triggering, combination of the two, and reporting periodically.

At step 405, the GCS AS takes an action to reduce influence of the congestion or overload.

The GCS AS determines influenced target UE and trunking service at first, and takes different actions for congestion and overload information. For example, in case of congestion, the GCS AS sends a trunking service through a unicast bearer; and in case of overload, the GCS AS puts the trunking service in a queue and sends the trunking service after the overload ends, or, the GCS AS seizes a resource of a related trunking service by virtue of a high-priority trunking service.

At step 406, the one or more eNBs configured to detect the congestion or overload judge whether an end of congestion or overload is detected or not, step 407 is executed if the end of the congestion or overload is detected, otherwise step 402 is executed.

At step 407, the one or more eNBs configured to detect the congestion or overload send recovery indication information to the GCS AS.

A sending triggering manner may be any one of the following: event triggering, AS request triggering, combination of the two, and reporting periodically.

At step 408, the GCS AS selects a manner in which a trunking service is sent to target UE.

The embodiments of the disclosure further disclose a computer program, which includes a program instruction, and a computer may execute the control method in any one of embodiment 1 to embodiment 3 by executing the program instruction.

The embodiments of the disclosure further disclose a carrier carrying the computer program.

The embodiments of the disclosure further provide a method for controlling a trunking communication congestion or overload at an eNB side, which includes that:

one or more eNBs selected to detect congestion or overload detect a congestion or overload event of user plane data; and when a triggering condition is met, the one or more eNB selected send congestion or overload indication information to a GCS AS through an MCE.

The step that the one or more eNBs selected send the congestion or overload indication information to the GCS AS may include that:

the one or more eNBs selected report all TMGIs, which represent a trunking service influenced by congestion or overload, to an MCE; or the one or more eNBs selected report a state of a corresponding TMGI in a corresponding SAI to the GCS AS through an MCE according to the SAI and TMGI with status reporting requirements in a request message sent by the GCS AS.

Other implementation details are the same as the above.

The embodiments of the disclosure further provide a system for controlling trunking communication congestion or overload, which includes:

a selection component, which is configured in specific network equipment, configured to select one or more eNBs configured to detect congestion or overload of user plane data, and notify the one or more eNB selected;

a detection component, which is configured in the eNB, configured to detect a congestion or overload event of the user plane data when the eNB is selected;

a sending component, which is configured in the eNB, configured to send congestion or overload indication information to a GCS AS when a triggering condition is met; and a processing component, which is configured in the GCS AS, configured to determine a start or end of congestion or overload which occurs in an MBMS area according to the indication information reported by the one or more eNBs selected, and correspondingly select a manner in which trunking service data are sent.

In an example embodiment, the specific network equipment includes any one of the following:

an MCE, O&M and a GCS AS;

when the selection component is configured in the MCE, selecting the one or more eNBs configured to detect the congestion or overload refers to that:

the selection component maps an SAI required to be detected onto multiple cells, selects one or more cells from the multiple cells as one or more monitoring cells, and determines one or more eNBs to which the one or more monitoring cells belong as the one or more eNBs configured to detect the congestion or overload;

when the selection component is configured in the O&M, selecting the one or more eNBs configured to detect the congestion or overload refers to that:

the selection component selects one or more eNBs from an MBSFN area required to be detected as the one or more eNBs configured to detect the congestion or overload; and when the selection component is configured in the GCS AS, selecting the one or more eNBs configured to detect the congestion or overload refers to that:

the selection component selects one or more eNBs as the one or more eNBs configured to detect the congestion or overload.

In an example embodiment, the congestion or overload indication information includes at least one of the following:

a congestion or overload ID, a cell ID and/or SAI, a TMGI and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by the congestion or overload; and the congestion or overload starting ID is configured to indicate whether the congestion or overload starts or ends.

In an example embodiment, the sending component is configured to send the congestion or overload indication information to the GCS AS, which refers to that:

the sending component reports all TMGIs, which represent a trunking service influenced by congestion or overload, to the MCE, and the MCE reports a TMGI of a specific congested or overloaded service to the GCS AS, wherein the TMGI of the specific congested or overloaded service is selected by the MCE according to a corresponding relationship between a QCI or ARP and a TMGI; or the GCS AS requests an SAI and TMGI with status reporting requirements, and sends, through the MCE, a request message to the one or more eNBs, and the sending component reports a state of the TMGI in the SAI to the GCS AS through the MCE.

In an example embodiment, the congestion or overload event of the user plane data includes: an event in which the congestion or overload of the user plane data is switched from a starting state to an ending state, or an event in which the congestion or overload of the user plane data is switched from the ending state to the starting state.

In an example embodiment, the triggering condition includes any one of the following:

a condition in which the congestion or overload event of the user plane data is detected, a condition in which the GCS AS requests to send information, a condition which the GCS AS requests to send information and the congestion or overload event of the user plane data is detected, and a condition of reporting periodically.

Figure 7:
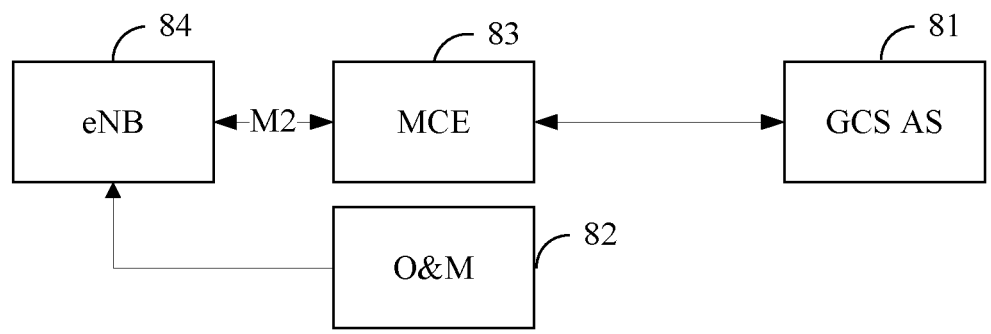
FIG. 7 is a structure diagram of a system for controlling trunking communication congestion according to an embodiment of the disclosure.

An embodiment of the control system, as shown in FIG. 7, includes:

a GCS AS 81, configured to select one or more eNBs configured to detect congestion or overload, send congestion or overload request information to the one or more eNBs selected, receive congestion or overload and recovery indication information, perform processing according to the indication information and select a manner in which a trunking service is sent;

O&M 82, configured to select the eNB 84 for congestion or overload detection and notify the eNB;

an MCE 83, configured to receive the request information sent by the GCS AS 81 and the congestion or overload indication information sent by the eNB 84 and further configured to select the eNB 84 and notify the eNB 84; and the eNB 84, configured to detect a congestion or overload state, receive the indication information of the GCS AS 81, the O&M 82 and the MCE 83 and send the congestion or overload indication information to the GCS AS 81 through the MCE 83.

In order to implement the abovementioned method, the embodiments of the disclosure further provide a device for controlling congestion or overload, which is configured in an eNB and includes:

a detection component, configured to, when the eNB is selected to detect congestion or overload, detect a congestion or overload event of user plane data; and a sending component, configured to, when a triggering condition is met, send congestion or overload indication information to a GCS AS.

Figure 8:
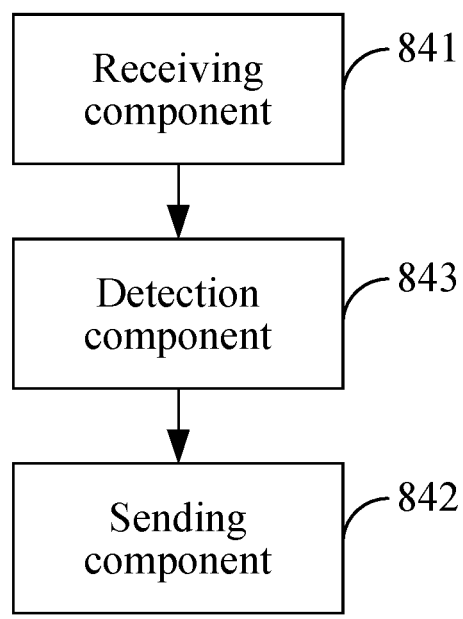
FIG. 8 is a structure diagram of an eNB for controlling trunking communication congestion according to an embodiment of the disclosure.

An embodiment of the control device, as shown in FIG. 8, includes:

a receiving component 841, configured to receive congestion or overload request information and indication information;

a sending component 842, configured to send the congestion or overload indication information; and a detection component 843, configured to detect a congestion or overload event.

In an example embodiment, sending the congestion or overload indication information to the GCS AS refers to that:

the sending component reports all TMGIs, which represent a trunking service influenced by congestion or overload, to an MCE; or the sending component reports a state of a corresponding TMGI in a corresponding SAI to the GCS AS through the MCE according to the SAI and TMGI with status reporting requirements in a request message sent by the GCS AS.

Other implementation details of the control device may refer to the above.

The embodiments of the disclosure further provide an eNB, which includes the abovementioned control device.

Of course, the disclosure may have many other example embodiments, those skilled in the art may make various corresponding variations and transformations according to the disclosure without departing from the spirit and essence of the disclosure, and these corresponding variations and transformations shall fall within the scope of protection of the claims of the disclosure.

INDUSTRIAL APPLICABILITY

According to the technical solutions of the disclosure, it is realized that when congestion or overload of MBMS user plane data occurs, congestion or overload of an MBMS area may be determined according to indication information of a part of eNBs, so that efficiency is improved, an influence of network congestion or overload on a trunking service is reduced, and service experiences of a user are improved. Therefore, the disclosure has high industrial practicability.

What is claimed is:

1. A method for controlling congestion or overload, comprising:
    selecting one or more Evolved Node Bs (eNBs) configured to detect congestion or overload of user plane data, and notifying the one or more eNBs selected;
    detecting, by the one or more eNBs selected, a congestion or overload event of the user plane data;
    sending, by the one or more eNBs selected, congestion or overload indication information to a Group Communication Service (GCS) Application Server (AS) when a triggering condition is met, wherein the congestion or overload indication information comprises at least one of the following information: a congestion or overload Identity (ID), a cell ID and/or a Service Area Identifier (SAI), a Temporary Mobile Group Identity (TMGI) and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by congestion or overload; and the congestion or overload starting ID is configured to indicate whether congestion or overload starts or ends; and
    determining, by the GCS AS, a start or end of congestion or overload which occurs in a Multimedia Broadcast Multicast Service (MBMS) area according to the congestion or overload indication information reported by the one or more eNBs selected, and selecting, by the GCS AS, a manner in which trunking service data are sent.

2. The method as claimed in claim 1, wherein selecting the one or more eNBs configured to detect the congestion or overload of the user plane data comprises:
    mapping, by a Multicell/Multicast Coordination Entity (MCE), a Service Area Identifier (SAI) required onto be detected to multiple cells, selecting, by the MCE, one or more cells from the multiple cells as one or more monitoring cells, and determining, by the MCE, one or more eNBs to which the one or more monitoring cells belong as the one or more eNBs configured to detect the congestion or overload of the user plane data; or,
    selecting, by Operation and Maintenance (O&M), one or more eNBs in an MBMS over a Signal Frequency Network (MBSFN) area required to be detected as the one or more eNBs configured to detect the congestion or overload of the user plane data; or,
    selecting, by the GCS AS, one or more eNBs as the one or more eNBs configured to detect the congestion or overload of the user plane data.

3. The method as claimed in claim 1, wherein sending, by the one or more eNBs selected, the congestion or overload indication information to the GCS AS comprises:
    reporting, by the one or more eNBs selected, all Temporary Mobile Group Identities (TMGIs), which represent a trunking service influenced by congestion or overload, to a Multicell/Multicast Coordination Entity (MCE), and reporting, by the MCE, a TMGI of a specific congested or overloaded service to the GCS AS, wherein the TMGI of the specific congested or overloaded service is selected by the MCE according to a corresponding relationship between a Quality of Service Class Identifier (QCI) or Allocation and Retention Priority (ARP) and a TMGI; or,
    requesting, by the GCS AS, a Service Area Identifier (SAI) and TMGI with status reporting requirements, sending, by the GCS AS, a request message, through an MCE, to the one or more eNBs selected, and reporting, by the one or more eNBs selected which receive the request message, a state of the TMGI in the SAI to the GCS AS through the MCE.

4. The method as claimed in claim 1, wherein the congestion or overload event of the user plane data comprises:
    an event in which the congestion or overload of the user plane data is switched from a starting state to an ending state, or an event in which the congestion or overload of the user plane data is switched from the ending state to the starting state.

5. The method as claimed in claim 1, wherein the triggering condition comprises any one of the following conditions:
    a condition in which the congestion or overload event of the user plane data is detected, a condition in which the GCS AS requests to send information, a condition in which the GCS AS requests to send information and the congestion or overload event of the user plane data is detected, and a condition of reporting periodically.

6. A method for controlling congestion or overload, comprising:
    detecting, by one or more Evolved Node Bs (eNBs) selected to detect congestion or overload, a congestion or overload event of user plane data; and
    sending, by the one or more eNBs selected, congestion or overload indication information to a Group Communication Service (GCS) Application Server (AS) when a triggering condition is met, wherein the congestion or overload indication information comprises at least one of the following information: a congestion or overload identity (ID), a cell ID and/or a Service Area Identifier (SAI), a Temporary Mobile Group Identity (TMGI) and a congestion or overload starting ID, wherein the congestion or overload ID is configured to indicate congestion or overload in a network; the cell ID is configured to indicate a cell influenced by congestion or overload; the SAI is configured to indicate a Multimedia Broadcast Multicast Service (MBMS) area influenced by congestion or overload; the TMGI is configured to indicate a trunking service influenced by congestion or overload; and the congestion or overload starting ID is configured to indicate whether congestion or overload starts or ends.

7. The method as claimed in claim 6, wherein sending, by the one or more eNBs selected, the congestion or overload indication information to the GCS AS comprises:

reporting, by the one or more eNBs selected, all Temporary Mobile Group Identities (TMGIs), which represent a trunking service influenced by congestion or overload, to a Multicell/Multicast Coordination Entity (MCE); or, reporting, by the one or more eNBs selected, a state of a TMGI in a Service Area Identifier (SAI) to the GCS AS through an MCE according to the SAI and TMGI with status reporting requirements in a request message sent by the GCS AS.

8. The method as claimed in claim 6, wherein the congestion or overload event of the user plane data comprises: an event in which the congestion or overload of the user plane data is switched from a starting state to an ending state, or an event in which the congestion or overload of the user plane data is switched from the ending state to the starting state.

9. A system for controlling congestion or overload, comprising a selection component, a detection component, a sending component and a processing component, wherein the selection component, which is configured in network equipment, configured to select one or more Evolved Node Bs (eNBs) configured to detect congestion or overload of user plane data, and notify the one or more eNBs selected;

the detection component, which is configured in an eNB, configured to detect a congestion or overload event of the user plane data when the eNB is selected;

the sending component, which is configured in the eNB, configured to send congestion or overload indication information to a Group Communication Service (GCS) Application Server (AS) when a triggering condition is met, wherein the congestion or overload indication information comprises at least one of the following information: a congestion or overload Identity (ID), a cell ID and/or a Service Area Identifier (SAI), a Temporary Mobile Group Identity (TMGI) and a congestion or overload starting ID, wherein the congestion or overload ID is configured to indicate congestion or overload in a network; the cell ID is configured to indicate a cell influenced by congestion or overload; the SAI is configured to indicate an MBMS area influenced by congestion or overload; the TMGI is configured to indicate a trunking service influenced by congestion or overload; and the congestion or overload starting ID is configured to indicate whether congestion or overload starts or ends; and the processing component, which is configured in the GCS AS, configured to determine a start or end of congestion or overload which occurs in a Multimedia Broadcast Multicast Service (MBMS) area according to the congestion or overload indication information reported by the one or more eNBs selected, and select a manner in which trunking service data are sent.

10. The system as claimed in claim 9, wherein the network equipment comprises any one of the following equipment:

a Multicell/Multicast Coordination Entity (MCE), Operation and Maintenance (O&M) and a GCS AS;

wherein the selection component is configured to select the one or more eNBs configured to detect the congestion or overload according any one of the following manners:

when the selection component is configured in the MCE, mapping, by the selection component, a Service Area Identifier (SAI) required to be detected onto multiple cells, selecting, by the selection component, one or more cells from the multiple cells as one or more monitoring cells, and determining, by the selection component, one or more eNBs to which the one or more monitoring cells belong as the one or more eNBs configured to detect the congestion or overload of the user plane data;

when the selection component is configured in the O&M, selecting, by the selection component, one or more eNBs in an MBMS over a Signal Frequency Network (MBSFN) area required to be detected as the one or more eNBs configured to detect the congestion or overload of the user plane data; and when the selection component is configured in the GCS AS, selecting, by the selection component, one or more eNBs as the one or more eNBs configured to detect the congestion or overload of the user plane data.

11. The system as claimed in claim 9, wherein the sending component is configured to send the congestion or overload indication information to the GCS AS according to the following manner:

reporting, the sending component, all Temporary Mobile Group Identities (TMGIs), which represent a trunking service influenced by congestion or overload, to a Multicell/Multicast Coordination Entity (MCE), and reporting, by the MCE, a TMGI of a specific congested or overloaded service to the GCS AS, wherein the TMGI of the specific congested or overloaded service is selected by the MCE according to a corresponding relationship between a Quality of Service Class Identifier (QCI) or Allocation and Retention Priority (ARP) and a TMGI; or, requesting, by the GCS AS, a Service Area Identifier (SAI) and TMGI with status reporting requirements, sending, by the GCS AS, a request message, through an MCE, to the one or more eNBs selected, and reporting, by the sending component, a state of the TMGI in the SAI to the GCS AS through the MCE.

12. The system as claimed in claim 9, wherein the congestion or overload event of the user plane data comprises: an event in which the congestion or overload of the user plane data is switched from a starting state to an ending state, or an event in which the congestion or overload of the user plane data is switched from the ending state to the starting state; or the triggering condition comprises any one of the following conditions: a condition in which the congestion or overload event of the user plane data is detected, a condition in which the GCS AS requests to send information, a condition in which the GCS AS requests to send information and the congestion or overload event of the user plane data is detected, and a condition of reporting periodically.

13. A device for controlling congestion or overload, configured in an Evolved Node B (eNB) comprising a detection component and a sending component, wherein the detection component is configured to, when the eNB is selected to detect congestion or overload, detect a congestion or overload event of user plane data; and the sending component is configured to, when a triggering condition is met, send congestion or overload indication information to a Group Communication Service (GCS) Application Server (AS), wherein the congestion or overload indication information comprises at least one of the following information: a congestion or overload identity (ID), a cell ID and/or a Service Area Identifier (SAI), a Temporary Mobile Group Identity (TMGI) and a congestion or overload starting ID, wherein the congestion or overload ID is configured to indicate congestion or overload in a network; the cell ID is configured to indicate a cell influenced by congestion or overload; the SAI is configured to indicate a Multimedia Broadcast Multicast Service (MBMS) area influenced by congestion or overload; the TMGI is configured to indicate a trunking service influenced by congestion or overload; and the congestion or overload starting ID is configured to indicate whether congestion or overload starts or ends.

14. The device as claimed in claim 13, wherein the sending component is configured to send the congestion or overload indication information to the GCS AS according to the following manner:
   reporting, by the sending component, all Temporary Mobile Group Identities (TMGIs), which represent a trunking service influenced by congestion or overload, to a Multicell/Multicast Coordination Entity (MCE); or,
   reporting, the sending component, a state of a TMGI in a Service Area Identifier (SAI) to the GCS AS through an MCE according to the SAI and TMGI with status reporting requirements in a request message sent by the GCS AS.

15. The device as claimed in claim 13, wherein
the congestion or overload event of the user plane data comprises: an event in which the congestion or overload of the user plane data is switched from a starting state to an ending state, or an event in which the congestion or overload of the user plane data is switched from the ending state to the starting state; or
the triggering condition comprises any one of the following conditions: a condition in which the congestion or overload event of the user plane data is detected, a condition in which the GCS AS requests to send information, a condition which the GCS AS requests to send information and the congestion or overload event of the user plane data is detected, and a condition of reporting periodically.

16. An Evolved Node B (eNB), comprising the control device as claimed in any one of claims 13.

* * * * *